(12) United States Patent
McCoy et al.

(10) Patent No.: US 11,890,536 B2
(45) Date of Patent: Feb. 6, 2024

(54) NEAR REAL-TIME AUGMENTED REALITY VIDEO GAMING SYSTEM

(71) Applicant: Sony Interactive Entertainment LLC, San Mateo, CA (US)

(72) Inventors: Charles McCoy, San Mateo, CA (US); True Xiong, San Mateo, CA (US); Blaine Morgan, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 418 days.

(21) Appl. No.: 17/189,147

(22) Filed: Mar. 1, 2021

(65) Prior Publication Data

US 2021/0178258 A1    Jun. 17, 2021

Related U.S. Application Data

(63) Continuation of application No. 16/354,607, filed on Mar. 15, 2019, now Pat. No. 10,933,317.

(51) Int. Cl.
| | |
|---|---|
| *A63F 13/00* | (2014.01) |
| *A63F 13/26* | (2014.01) |
| *G06T 15/20* | (2011.01) |
| *G06F 3/01* | (2006.01) |
| *A63F 13/213* | (2014.01) |
| *A63F 13/65* | (2014.01) |
| *A63F 13/22* | (2014.01) |

(52) U.S. Cl.
CPC ............ *A63F 13/26* (2014.09); *A63F 13/213* (2014.09); *A63F 13/22* (2014.09); *A63F 13/65* (2014.09); *G06F 3/011* (2013.01); *G06T 15/20* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 4,592,546 A | | 6/1986 | Fascenda et al. |
| 11,348,269 B1 | * | 5/2022 | Ebrahimi Afrouzi ... G01S 17/48 |
| 2004/0183824 A1 | | 9/2004 | Benson et al. |
| 2005/0153760 A1 | | 7/2005 | Varley |
| 2006/0046810 A1 | | 3/2006 | Tabata |
| 2006/0087585 A1 | | 4/2006 | Seo et al. |
| 2007/0265089 A1 | | 11/2007 | Robarts et al. |
| 2009/0083673 A1 | | 3/2009 | Fitzmaurice et al. |
| 2010/0331065 A1 | | 12/2010 | Cebolla et al. |

(Continued)

*Primary Examiner* — Paul A D'Agostino
(74) *Attorney, Agent, or Firm* — John L. Rogitz; John M. Rogitz

(57) ABSTRACT

One or more users wear respective wireless headsets or visors that allow the users to see a 3D rendered virtual reality environment emulating the physical space in which the user(s) are located and move. A user is allowed to move freely throughout the physical space while playing. The virtual reality environment that is rendered for a user is based on the user's physical movements. The virtual reality environment rendered for a user shows virtual objects where the corresponding physical objects are located so that as the user moves around the objects in the virtual environment the user also moves around the physical objects in the physical space. The floor of the physical space may be made of movable segments that move according to game play instructions.

16 Claims, 13 Drawing Sheets

(56) References Cited

U.S. PATENT DOCUMENTS

| | | | |
|---|---|---|---|
| 2012/0142415 A1* | 6/2012 | Lindsay | G06T 19/006 463/33 |
| 2016/0261841 A1 | 9/2016 | Mathew et al. | |
| 2018/0104614 A1 | 4/2018 | Gutierrez et al. | |
| 2018/0217662 A1* | 8/2018 | Smoot | A63B 24/0021 |
| 2018/0225963 A1 | 8/2018 | Kobayashi et al. | |
| 2018/0229115 A1 | 8/2018 | Lee | |
| 2018/0256962 A1 | 9/2018 | Kudirka et al. | |
| 2018/0260021 A1* | 9/2018 | Mullen | A63F 13/20 |
| 2021/0089040 A1* | 3/2021 | Ebrahimi Afrouzi | G05D 1/0248 |
| 2022/0026920 A1* | 1/2022 | Ebrahimi Afrouzi | G06N 3/045 |
| 2022/0066456 A1* | 3/2022 | Ebrahimi Afrouzi | B25J 9/1697 |

\* cited by examiner

NEAR REAL-TIME AUGMENTED REALITY VIDEO GAMING SYSTEM

FIELD

The application relates to near real-time augmented reality video simulation systems.

BACKGROUND

Video simulation such as video gaming is growing in popularity. As understood herein, simulations increasingly are played with multiple users in active environments that may have limited space.

SUMMARY

In an example implementation, an assembly includes at least a first headset in a first physical space containing at least a first object. The first headset is configured for presenting on a display of the first headset a virtual image of the first physical space from a perspective of the first headset relative to the first physical space. At least a second headset is not in the first physical space and is configured for presenting on a display of the second headset a virtual image of the first physical space from a virtual perspective of the second headset relative to the first physical space. In this way, a first wearer of the first headset can play a computer simulation in the first physical space by viewing the virtual image of the first physical space presented on the first headset while a second wearer of the second headset can play the computer simulation in concert with the first wearer by viewing the virtual image of the first physical space presented on the second headset.

In examples, the computer simulation may include a computer game such as an eSport. The first physical space thus may include an arena.

In example embodiments, plural movable segments are in the first physical space and. include at least a portion of a floor and/or at least a portion of at least one wall of the first physical space and/or an object in the first physical space. For example, the segments can include at least a portion of the floor and can define top surfaces that are movable up and down in the first physical space as dictated by the simulation instructions. Or, the segments may include at least a portion of at least one wall of the first physical space and can be moved toward and away from a center of the first physical space. Yet again, the segments may establish or include an object in the first physical space, such as a chair or bench that is movable into position in the first physical space to represent a place to sit in the computer simulation. The object, for example, that is established by the movable segments may include a seat with a steering wheel or other simulation control element such as a lever, a button, etc. that is manipulable to input user signals to a computer simulation.

In another aspect, an assembly includes at least a first headset in a first physical space containing at least a first object. The first headset is configured for presenting on a display of the first headset a virtual image of the first physical space from a perspective of the first headset relative to the first physical space. Plural movable segments are in the first physical space. The segments include at least a portion of a floor and/or at least a portion of at least one wall of the first physical space and/or an object in the first physical space.

In another aspect, a method includes imaging a physical space from headsets worn by respective users. The method further includes presenting virtualized models of the physical space on the headsets worn by respective users from perspectives of the respective users. At least a first one of the users is located in the physical space and at least a second one of the users is not located in the physical space. The method includes updating the virtualized models using near real time images of the physical space as the users move such that the virtualized models show objects where physical objects are located in the physical space so that as the first user moves around the objects in the respective virtualized model the first user also moves around corresponding objects in the physical space.

The details of the present application, both as to its structure and operation, can best be understood in reference to the accompanying drawings, in which like reference numerals refer to like parts, and in which:

DETAILED DESCRIPTION

Figure 1:
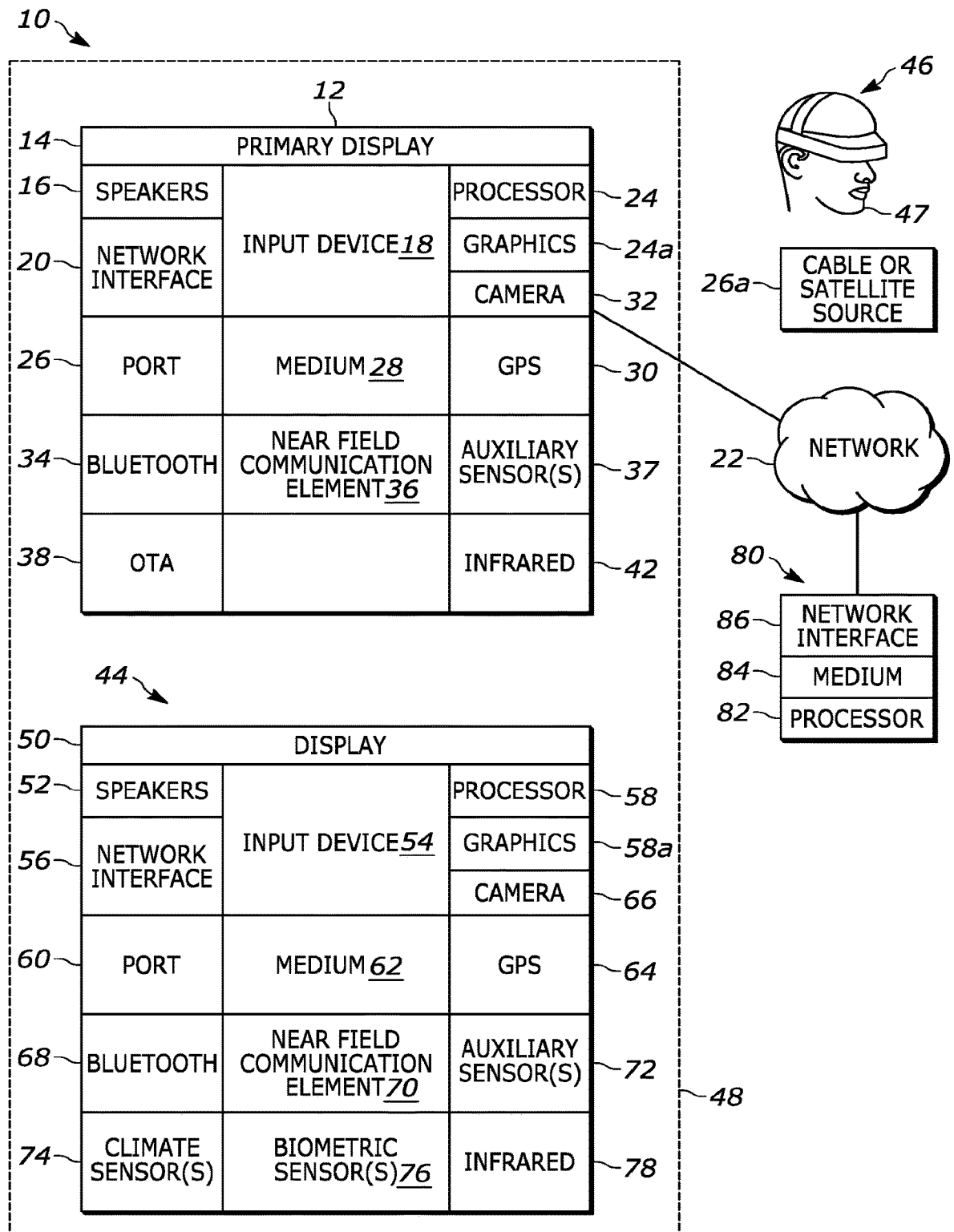
FIG. 1 is a block diagram of an example system including an example in accordance with present principles.

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSO and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized. Internet-enabled watch, a computerized Interpret-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g., entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones, For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device, A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/ microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared UR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
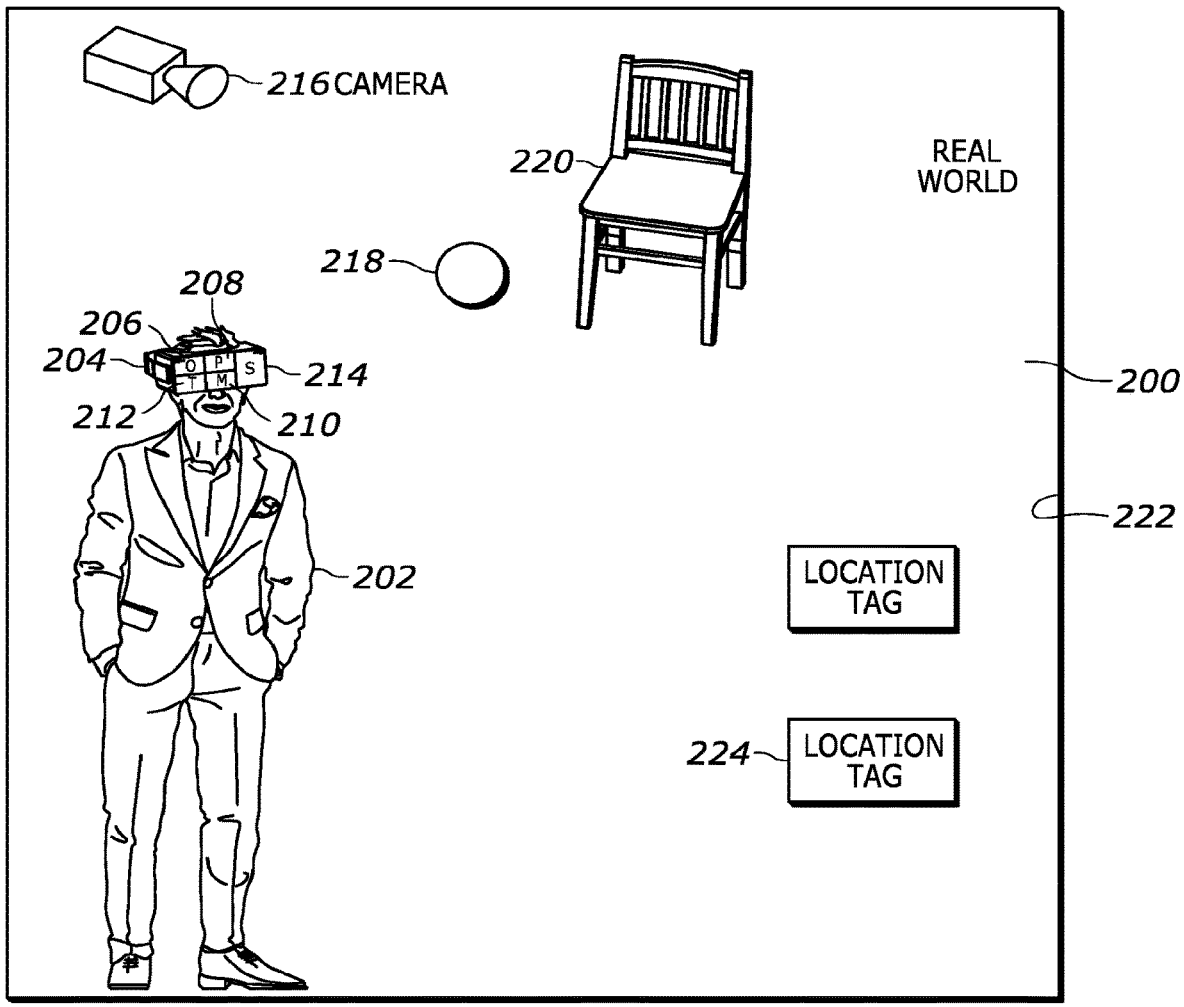
FIG. 2 is a schematic diagram of a real-world space with a player in the space wearing a VR/AR. headset.
Figure 3:
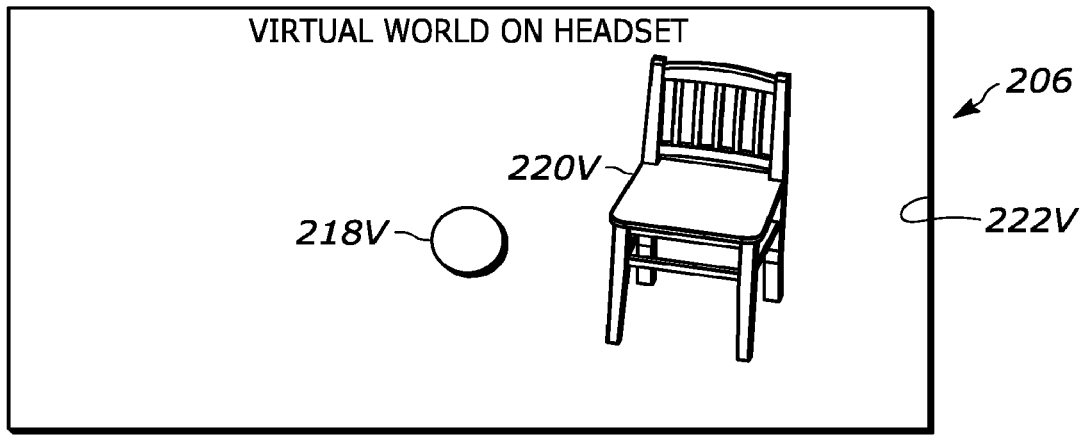
FIG. 3 is a schematic diagram of a VR space corresponding to the real-world space in FIG. 2, as presented on a display of the headset in FIG. 2.

FIGS. 2 and 3 illustrate a technique for a gaming system that allows users to play a video game in a physical (real world) space 200. While multiple users are envisioned, for clarity only a single user 202 is shown in FIG. 2 wearing a headset 204 that can incorporate some or all of the components disclosed above. Present principles apply to only one user as well as to plural users. The headset 204 may include a video display 206, one or more processors 208 accessing one or more computer media 210 to control the display 206, one or more wireless transceivers 212, and one or more sensors 214 such as cameras and other imaging devices including laser snapping transceivers, position sensors such as global positioning satellite (GPS) sensors, orientation sensors such as accelerometers, magnetometers, and gyroscopes, etc. The sensors may also or alternatively include video cameras, echolocation, radar, lasers, or light direction and finding (lidar). These sensors can either embedded into the headset or in plug-n-play external modules to the headset.

One or more fixed cameras or other sensors 216 may be positioned in the space 200 as shown. Any of the sensors shown in FIG. 2 may be used to image objects and players (users) in the space including balls 218, furniture or other fixtures 220, and walls 222 of the space 200. In non-limiting examples, the sensors (with associated processors) can generate in near-real time three dimensional (3D) depth maps of the objects and space 200 using, by way of non-limiting example, any of the techniques divulged in U.S. Pat. Nos. 10,181,089 and 10,178,370 and USPPs 2018/0173990, 2018/0156900, 2018/0160094, 2018/0231641, 2018/0288385, 2018/0252815, and U.S. patent application Ser. No. 16/019,140, owned by Sony Corp. and incorporated herein by reference. In addition or alternatively, standalone location markers 224 such as light emitting diodes (LED) or ultra-wideband (UWB) tags can be placed within the space 200 (e.g., at the cornier of room, room boundary, and/or listening position) and the distance from each standalone marker to the headset be detected as representing wall 222 boundaries and/or location and orientation of the user 202 within the space 200 relative to the fixed markers 224 using, e.g., triangulation. Details of such space mapping are divulged in U.S. Pat. No. 10,075,791, owned by Sony Corp. and incorporated herein by reference.

It will be appreciated that when the sensor 214 on the headset 204 is used to establish a map of the objects and space 200, the image may be used to as a virtual representation of the space from the position and orientation of the user 202 and may be presented on the headset display 206 as shown in FIG. 3. The virtual image includes virtual walls 222V emulated in virtual space to be at the corresponding locations of the walls 222 of the physical space 200 in FIG. 2. The virtual image also includes virtual objects 218V, 220V emulated in virtual space to be at the corresponding locations of the objects 218, 220 in the physical space 200 in FIG. 2.

In this way, the user 202 wears a wireless headset or visor that allows him to see a 3D rendered virtual reality environment. The user 202 is allowed to move freely throughout the physical space 200 while playing. The virtual reality environment that is rendered for the user is based on the user's physical movements. The virtual reality environment rendered for the user shows virtual objects 218V, 220V where the corresponding physical objects 218, 220 are located so that as the user moves around the objects 218V, 220V in the virtual environment the user also moves around the physical objects 218, 220 in the physical space 200.

As understood herein, the above technique may be used in an arena setting, such as a laser tag arena or a paintball field that are already designed for people to play games that involve user movement. The above technique is effective for e-sports, being a hybrid of existing video games and existing physical sports. The physical space 200 thus may be an arena. The physical space 200 alternatively may be a pod, essentially an enclosure that may be provided to a user and set up in the user's home or other area as a personalized e-sport "arena". A facility may include a plurality of pods to support multiple players, with each playing in their own physical environment.

Figure 4:
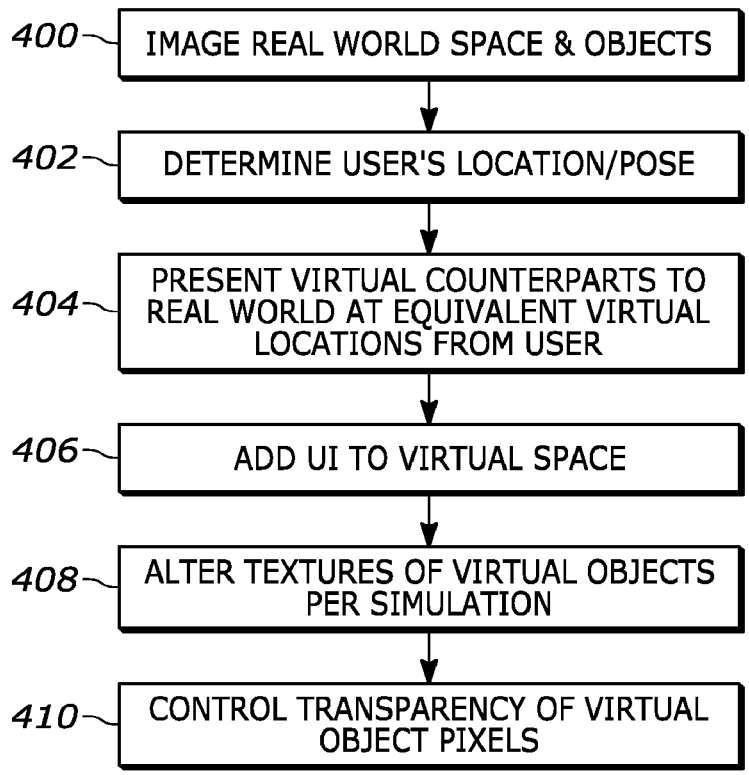
FIG. 4 is a flow chart of example logic associated with FIGS. 2 and 3.

FIG. 4 illustrates logic related to the above description, which may be implemented by the processor 208 in the headset 206 and/or other processors communicating therewith via the transceiver 212. The processor 208 may be implemented in an object such as a backpack that communicates via wired and/or wireless paths with the headset. The processor 208 may be implemented in the arena, especially if the communication to the headset is done wirelessly.

Commencing at block 400, the real world (physical) space 200 in FIG. 2 is imaged, e.g., by generating a 3D depth map of the walls 200 and objects within the space using images from one or more of the sensors described herein. Proceeding to block 402, the logic determines, in near-real time (real time plus processing and communication delays, typically less than a second) the user's location and/or pose (orientation) using signals from the appropriate sensor(s) 214 in FIG. 2 relative to the physical space 200. Images of the user 202. from the cameras 216 may also be used for this purpose. Using this information, at block 404 the logic presents on the headset display 206 virtual objects 222V, 218V, 220V in the rendering of the virtual environment that correspond to those locations, rendered to look like they belong in the simulation environment.

This may include rendering of objects in the virtual environment using the shapes and locations of the physical world objects as a frame for the objects in the simulation and can include overlaying onto the virtual objects a user interface (UI) at block 406 and/or theme matching texture maps at block 408 based on the simulation environment. When playing in a fixed physical environment, the mapping of the textures to the physical objects can be statically determined. The mapping of textures to physical objects may change as indicated at block 408 during the simulation in synchronization with simulation play as indicated, e.g., in texture codes contained within the simulation program. In this way, if the user 202 moves from one area or level in the simulation to another then the same physical environment can be reused with different texture maps to represent the new area in the simulation.

For example, in some game areas the walls may be textured to look like old weathered wood to represent being in an old-style saloon. There may even be pictures or mirrors hanging on the walls. There may be windows rendered on a surface, allowing players to view the game environment beyond that surface through the rendered window. In other game areas the walls may be textured to look like moss covered stone to resemble the ruins of old stone buildings.

In some implementations the headset 204 worn by the user 202 has cameras and portions of the video from those cameras are incorporated into the images rendered in the headset.

Block 410 indicates that in some implementations, the headset can control the transparency of a pixel and some pixels in the displayed image are displayed with full and/or partial transparency to let the user view that portion of the real-world environment through the visor display. Transparency control typically is synchronized with simulation play.

Figure 5:
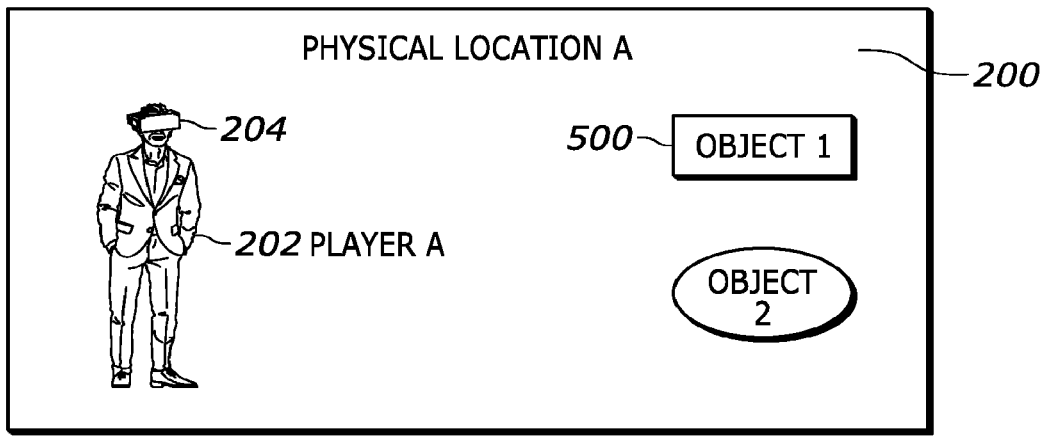
FIGS. 5-7 are schematic diagrams of two physical spaces (FIGS. 5 and 6) and a virtual space (FIG. 7) corresponding to the first real world space in FIG. 5 and showing a virtual representation of a player in the second physical space in FIG. 6.
Figure 6:
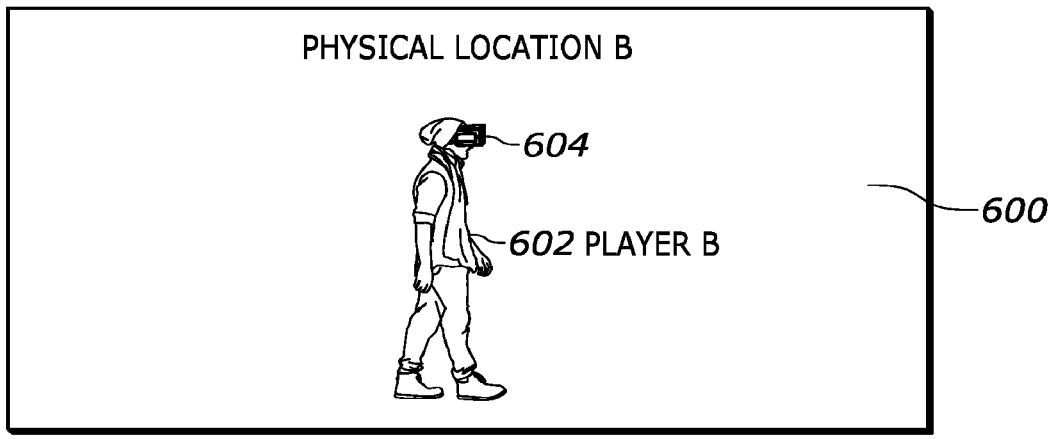
Figure 7:
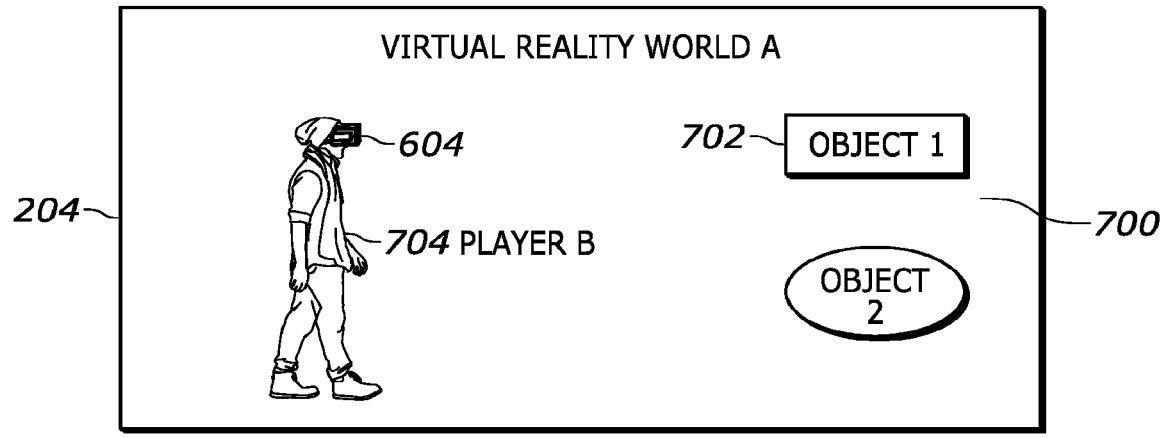

FIGS. 5-7 illustrate how two separate physical locations can be linked such that a composite virtual representation of elements of the two locations can be rendered on the headset 204. FIG. 5 illustrates that the first player or user 202 may be located in the first physical space 200 in which are multiple real-world objects 500 (which can include walls or other boundaries of the physical space). FIG. 6 illustrates a second physical space 600 distanced from the first physical space 500 in which a second player or user 602 with headset 604 is located, playing a simulation with the first player 202. FIG. 7 illustrates a virtual world 700 that may be presented on the headset 204 of the first player 202 showing virtual renderings 702 of the real world objects 500 in the first physical space along with a virtual image 704 of the second player 602 at a location and pose derived from the real world location and pose of the second player 602 and communicated to the first headset 204. Similarly, the headset 604 of the second player 602 may present the virtual world 700 (a virtual depiction of the first physical space 200) except with a virtual image of the first player or user 202 at a location and pose derived from the real-world location and pose of the first player 202.

Thus, in some implementations, multiple physical locations, which may or may not be identical to each other, are linked so that one or more players are in a first physical location and one or more players are in a second location. More than two locations are possible. The multiple physical locations are all linked to represent the same virtual game environment and all physical locations ideally comply with the particular physical requirements of the same e-sport, even if not identically configured. The system may render players in other physical locations so that a player will see that player in the corresponding location in the virtual gaming environment even though that player is not in the same physical gaming environment. Such an implementation may be used for organized eSports where there is a standardized physical location to play in and each team plays in their own physical location, but they play against other teams in other physical locations. This facilitates sports such as intercollegiate virtual laser tag where each participating college can have their own arena set up and matches can be streamed with multiple video feeds.

Figure 8:
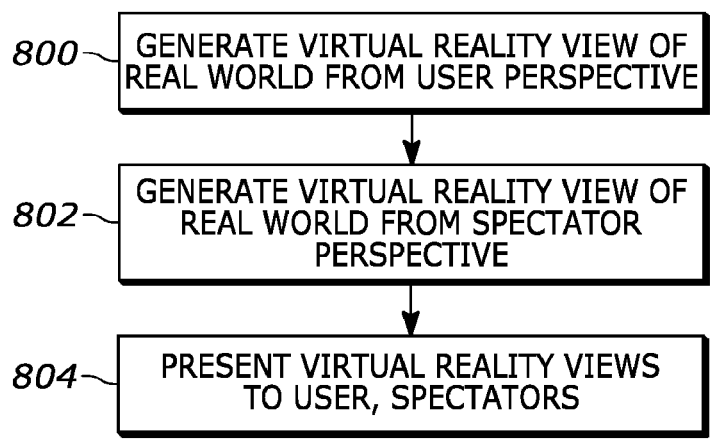
FIG. 8 is a flow chart of example logic for generating multiple views of the VR space from different perspectives.

FIG. 8 illustrates that as disclosed above, at block 800 virtual views of real-world simulation play locations are generated from the player/user perspectives. Additionally, as indicated at block 802, in some implementations video feeds of the virtual simulation environment may be generated that are not from the perspective of a particular player's field of view. Such video feeds may be generated from the location and perspective of a presumed spectator for display to an audience that is spectating the game and may be streamed to remote locations of spectators and stored or recorded for future viewing. Such video feeds can be from a fixed location meant to show an interesting portion of the arena, or may automatically follow a particular player's character, or may be controlled by a human that is not a player in the game. The various player and spectator views are presented on the appropriate displays at block 804 to the player/users and spectators.

Figure 9:
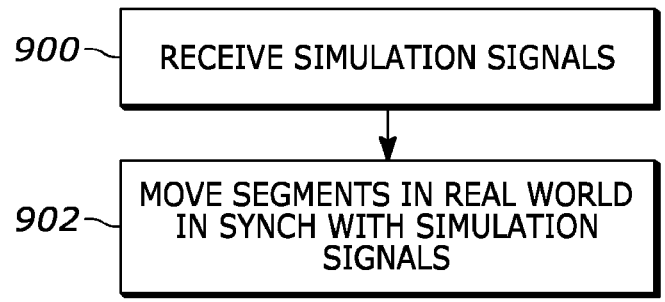
FIG. 9 is a flow chart of example logic for moving physical space segments in synchronization with computer simulation signals.

Turning to FIG. 9, in some implementations the physical environment in which the user plays can include segments that move to allow the physical environment to be changed according to the simulation being played in the environment, signals from which are received at block 900. Moving to block 902, in synchronization with the simulation play, segments can be raised from the floor and/or lowered from the ceiling. Walls may move and/or sections of the floor may tilt or raise or lower in sections to form ramps or stairs. Sections of the floor may raise up to form a platform at a seating height for players to sit on. Similarly, a structure, such as a chair or bench may move into position in the physical environment to represent a place to sit in the game. Some physical space objects may be customized for a specific type of game, such as a seat with a steering wheel and pedals to simulate getting into a vehicle, which may further be designed to move to simulate the motion of the vehicle. Reconfigurations of the physical space can allow the physical environment to represent different simulation areas during simulation play, allowing the virtual simulation area to be larger than the physical environment. An in-simulation mechanism such as portals or riding in a transportation device such as an elevator or train can be used for the character to move from one simulation area to another.

Yet again, a relation may be established between the computer simulation and movement of the segments such that when a player blows up objects (e.g. walls/floor/stairs/chairs) in a virtual environment, the segment corresponding to the blown-up object in the physical environment is moved away so that the object/segment will not block a way the player wants to move. Further details of these techniques are described below.

In some implementations an empty physical environment can be used when the virtual simulation environment shows obstacles that the player must maneuver around. In some implementations the physical environment may have segments that move while the user is on that segment.

Figure 10:
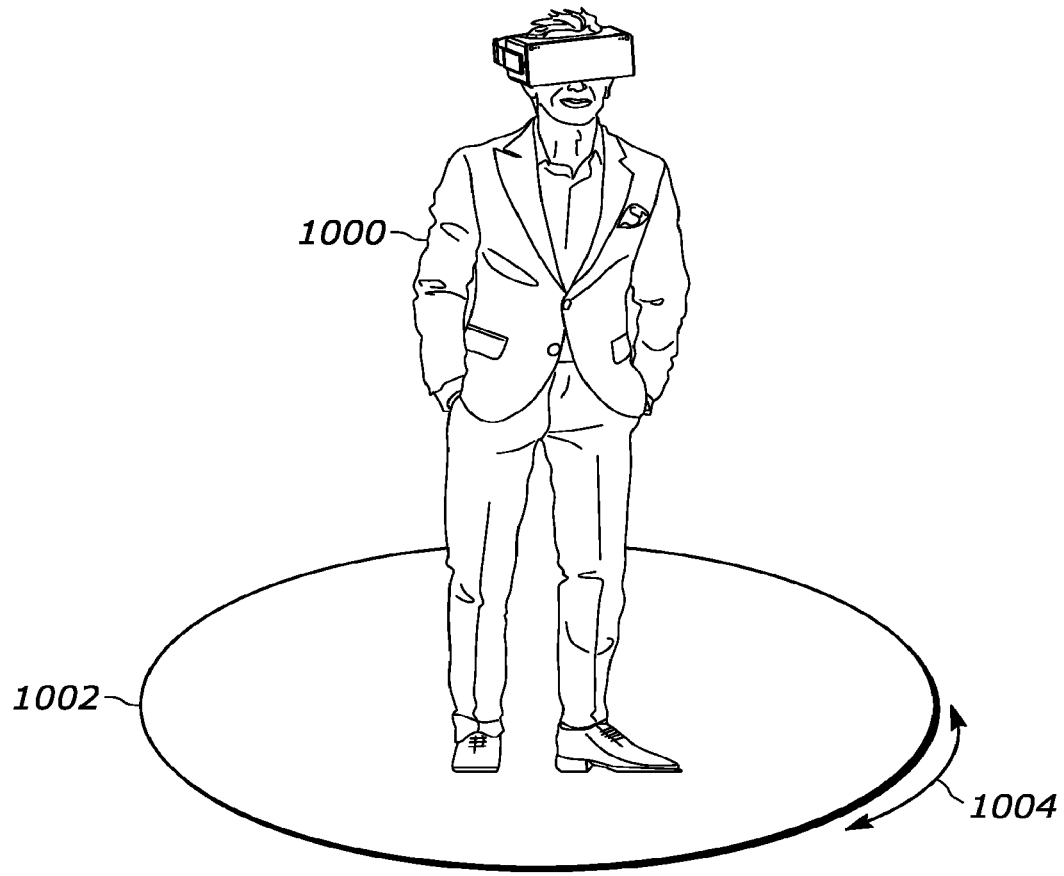
FIG. 10 schematically shows a player on a first type of physical space segment, configured as a turntable.

Referring to FIG. 10, a player/user 1000 may stand on a rotatable turntable 1002 that can rotate back and forth as indicated by the arrows 1004 in synchronization with simulation signals. This facilitates an in-game experience in which the user walks for a while, then pauses which may be to overcome an in-game obstacle such as opening a locked door, then walks more in the same direction. While the user is paused, the turntable 1002. on which the user is standing can slowly spin around so that the user is then facing the opposite direction. The user experiences travel in a single direction for a distance that is longer than any of the physical dimensions of the physical space he is playing in. By having rotating circular areas on opposite ends of the physical space this travel forward in a straight line in simulation can continue indefinitely.

Some simulations may have the user remove his visor at times to interact directly with the physical environment, such as to solve a physical puzzle, or interact with a touch screen display.

In some implementations players will play in concert with (e.g., against) other players in the same physical environments. In some implementations all of the players in the same physical environment play on the same team. In some implementations the system may render virtual objects in the game environment that are not present in the physical environment. These objects may be virtual opponents or creatures in the game, or may be inanimate objects, such as a statue or a floating orb. These objects may also be a light source, such as a lamp, or a torch hanging in a wall sconce, in which case these objects will affect the lighting for how other objects are rendered.

Figure 11:
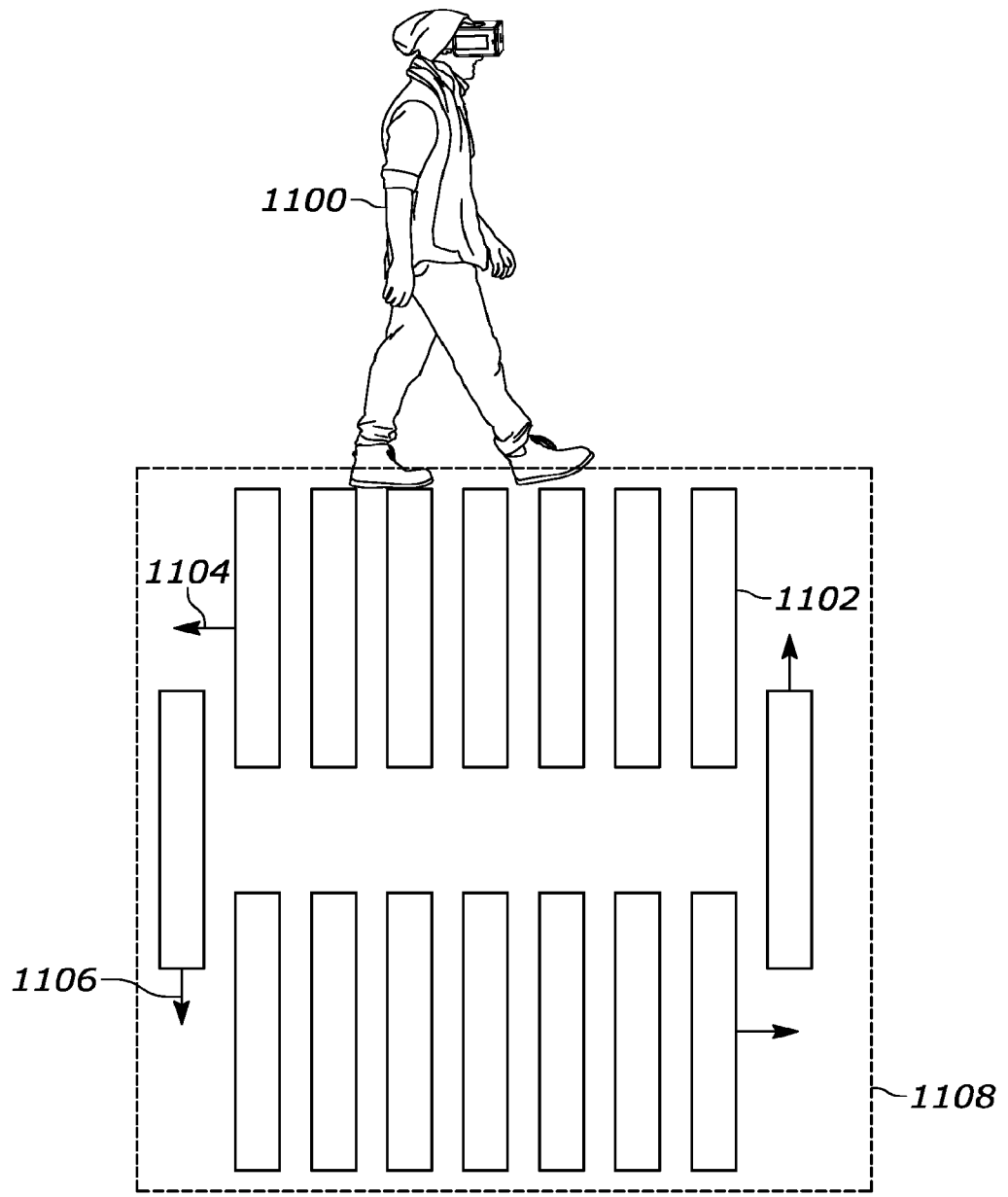
FIGS. 11-14 are schematic diagrams related to physical space segments configured as pillars.

FIGS. 11-16 illustrate further details of moving segments of the real-world physical location as dictated by simulation play instructions discussed above for a more realistic experience for the user. FIG. 11 illustrates that the floor of a physical space on which a player/user 1100 stands and walks may be established by a recirculating grid of pillars 1102. The pillars 1102 can move in the horizontal dimension as indicated by the arrow 1104 and can raise or lower create a shaped surface. This set of pillars can move to keep a user standing on them within a particular area. This is accomplished by having pillars in the direction the grid is moving in drop down below the pillars in the grid as indicated by the arrow 1106, in which they are moved under the grid and raised on the other side of the grid as shown so that the grid does not run out of pillars as it moves. Such a system can allow a user to walk or run indefinitely in any direction. The pillars may be engaged with a conveyor mechanism 1108 such as a conveyor belt or other conveyance structure.

Figure 12:
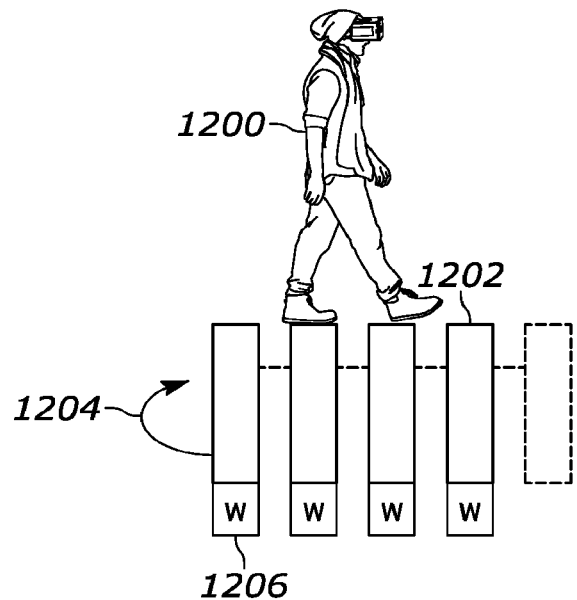

As shown in FIG. 12, a user 1200 may walk on a physical space floor established by pillars 1202 that are removed from the pillar grid on one side and are then moved around the sides of the grid as indicated by the arrow 1204 to be added to the other side of the grid, i.e., without recirculating pillars below the grid. Such a system would not require the pillars to move up or down to be recycled, which can be good for installations with limited vertical clearance, or for systems in which the pillars are tall and have a large range of movement. Alternatively, the pillars can be moved up and above the user to recirculate to the other side of the grid. One or more pillars 1202 may be associated with weight sensors 1206 to sense the amount of any weight exerted on the pillar. Based on the sensed weight, the speed at which a pillar is lowered may he varied, e.g., may be quickened as weight is put on it to simulate marshy ground in which the user sinks.

Such a system can produce a VR pod where a user can explore an unbounded virtual reality world within a system that fits within a relatively small area. A VR arena may have multiple pods to allow multiple players to exist within the same virtual reality world.

The above pillars can have any cross-sectional shape or set of shapes that can be used to tile a plane, such as squares, rectangles, triangles, or hexagons. The dimensions of each pillar determine the resolution of detail that can be created by the grid.

The pillars can create physical representations of in-game objects such as uneven ground, stairs, benches, or walls by being raised or lowered. By having the whole grid slowly sink as the user increases in elevation, and slowly raise as the user decreases in elevation the system can keep the user within an acceptable vertical range.

Figure 13:
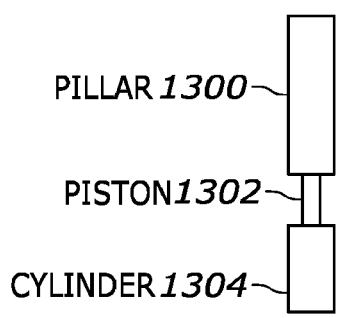
Figure 14:
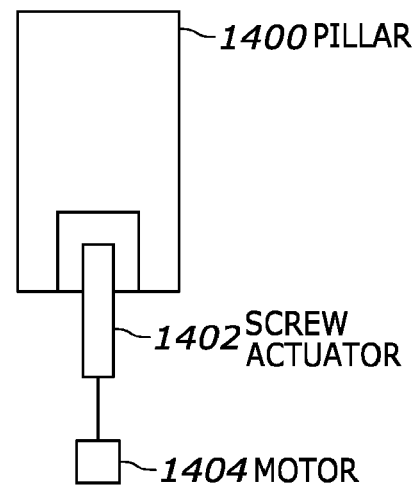

FIG. 13 illustrates a pillar 1300 that may be established by any of the pillars described herein which is moved up and down by a piston 1302 actuated by hydraulics in a cylinder 1304. FIG. 14 illustrates that alternatively, a pillar 1400 may be actuated by a screw-type actuator 1402 driven by a motor 1404 with a nut or other engagement device in the pillar 1400 holding the screw actuator so that as the screw is turned the pillar raises or lowers.

The pistons can have a padded surface on them for safety, such as a user running into an obstacle that he did not see when going through a dark area in a game. If the corners of the pistons are padded, then it can make an uneven surface formed by the pistons seem less jagged as the user walks on it.

The virtual reality simulation can trigger movements of the whole grid of pillars, including raising and lowering the pillars, and moving the whole grid of pillars. Depending on the size and frequency of the movements it can simulate such things as a floor in a factory that is vibrating because of the machinery, the ground shaking as a large creature walks by, or an earthquake.

In some implementations there may be a grid both above the user and below the user. The pillars above the user can be used to simulate things such as a wall with a hole in it where the user needs to crouch down or crawl to go under the barrier. Either the ceiling pillar grid or floor pillar grid may be recirculating or may be a fixed grid.

In some implementations the top surface of each pillar can be tilted to allow for a more uniform sloped surface to be created. By sloping the tops of the pillars opposite to the overall slope the surface can be made to feel jagged.

Figure 15:
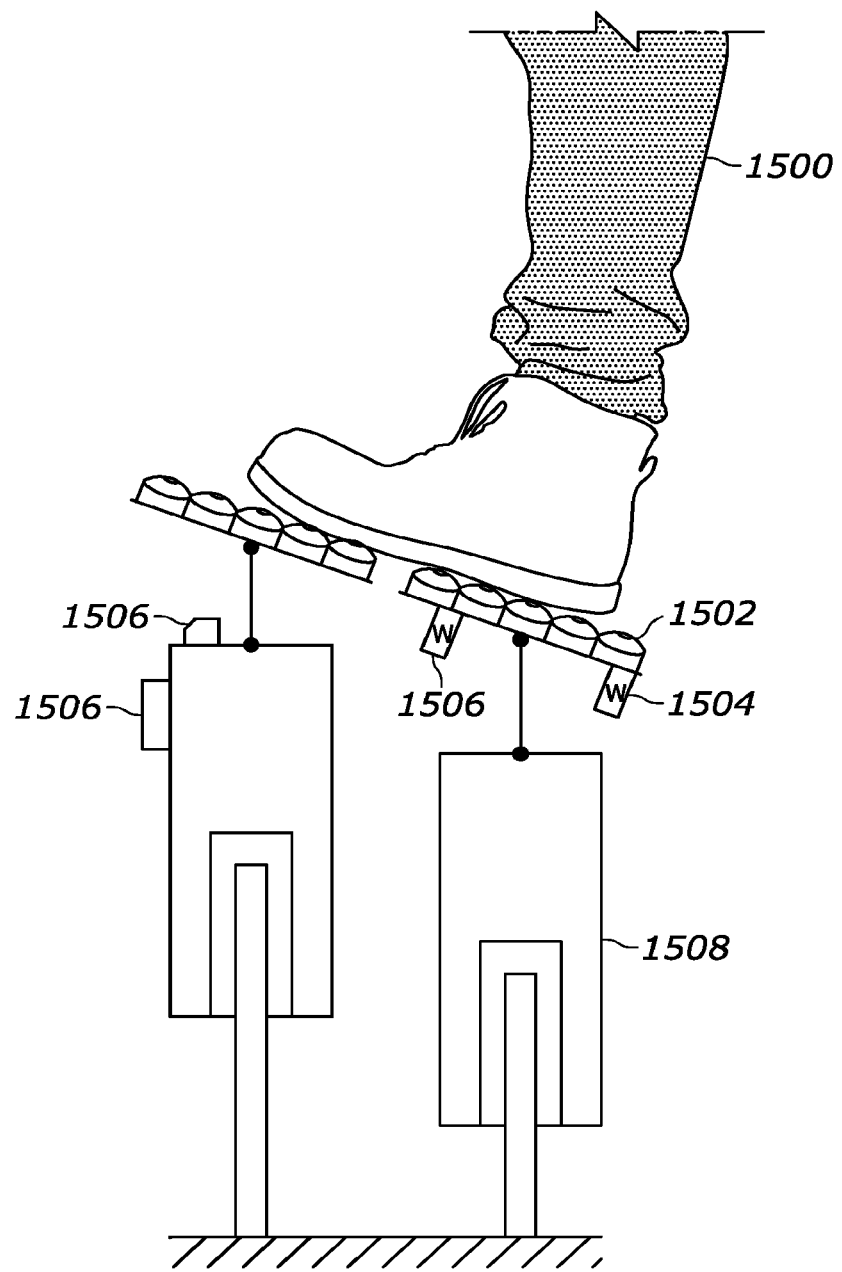
FIG. 15 is a schematic diagram related to physical space segments configured as balls, in the example shown in combination with pillars.

FIG. 15 illustrates a roller ball floor in which a player/user 1500 walks on multiple balls 1502, such as the balls used to move items around in factories. The balls may be spaced close enough together such that a user's foot would cover multiple balls as shown and would naturally slide onto neighboring balls as the foot moves within relationship to the balls.

Figure 17:
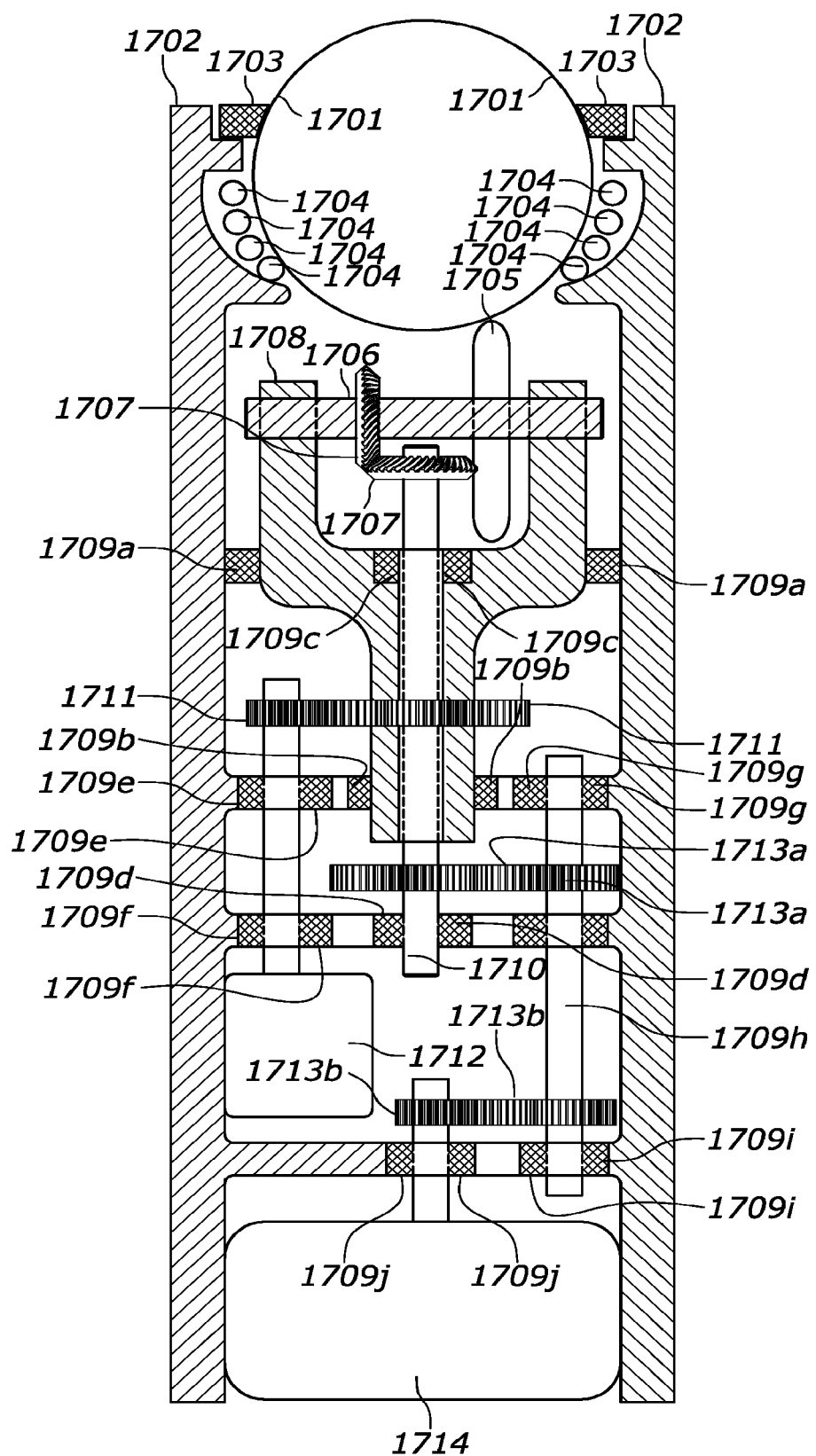
FIG. 17 is a cross section of a variable-axis motorized ball caster.

The balls may be motorized so that they can move a user who is standing or moving on the balls. In an example, rollers that can be used to have powered motion on multiple axes. An example is shown in FIG. 17, discussed further below. In another example, wheels of rollers may be mounted on a rotating shaft such as "omniwheels" made by Omnitrack of Stroud, U.K. The wheels can be mounted solidly to the shaft, with the rotation of the shaft controlling the motion of the floor in one axis. The rotation of the rollers on the wheels can control the motion of the floor in an opposing axis.

The rollers on the wheels can be motorized in multiple ways. An inner shaft within the shaft that the wheels are attached to may be provided and coupled to the wheels with gears and rods such that the rotation of the inner shaft in relationship to the outer shaft causes rotation of the rollers on the wheels. An example implementation of this is shown in FIG. 17 as discussed at length below. Or, motors can be provided on the wheels to rotate the rollers. The power to drive the motors can come from wiring that runs along each shaft and is connected through a rotating electrical connection, such as a slip ring.

Such a system can be used to move a user so that the user remains within the area above the balls as the user moves naturally in reaction to a virtual reality world. Such a system can be used to allow a user to walk or run indefinitely in any direction. Also, such a system can sense the location of the user's feet. This can be done using a weight sensor 1504 on each ball 1502. This can also be done with video cameras to detect the location of user's feed. Such a system can predict where a user's foot will come down and what movement the foot will have when it contacts the balls. This information can be used to engage the motors for the balls where the foot will come down so that the motion of the surface of the balls matches the motion of the foot when contact is made.

Moreover, air jets 1506 can be added to create moving air that impacts the user. Such a system can be used to simulate such things as walking through tall weeds, stormy weather, or a cat brushing up against the leg. The air jets 1506 can be mounted between the balls 1502 as shown, although in other implementations the air jets may be used without the balls 1502. In an implementation with pillars 1508 supporting the balls 1502 as shown in FIG. 15, air jets 1506 can be mounted on the sides of the pillars as well as on top of the pillars. In some implementations, air jets can be built into a headset, suit, backpack, controller, or other item that is worn or carried by the user. In some implementations, larger air jets are mounted at the parameter of the area in which the system maintains the user's location. These air jets can be movable, so that they can be swiveled around to come from different directions, and/or raised up and down so that they come from different heights. In some implementations, the temperature of the air jets can be adjusted, which would allow simulation of such things as entering a cold cave or standing near an erupting volcano.

When the balls 1052 are mounted on pillars 1508 as shown in FIG. 15, there would no longer be a need to have the grid of pillars recirculate as the motion of the balls is used to keep the user located above the grid. Such a system has the advantage that the user can feel like he is walking up or down hills or stairs. The pillars can also be used to simulate walls or other objects from the virtual world.

In another implementation, multiple balls can be mounted on each pillar. FIG. 15 shows multiple balls mounted on top of a movable plate on each pillar.

With continued reference to FIG. 15, in some implementations a pod can be made with a single grid of ball casters which can be tilted to simulate standing or walking on a slanted surface, such as a hill or a ramp. To tilt the grid in any direction, the grid may be supported at three points of the grid using supports that can be raised and lowered. Such an implementation can also move the whole grid up and down by extending and contracting all of the supports, which can be used to simulate things such as vibrations or larger ground movements. The whole grid may be moved down slightly as the player steps and starts to put weight on his foot to simulate soft ground. The grid may move up slowly between steps so that the grid does not run out of the range of its vertical movement, but the player is not distracted by noticing the upward movement of the grid.

Figure 16:
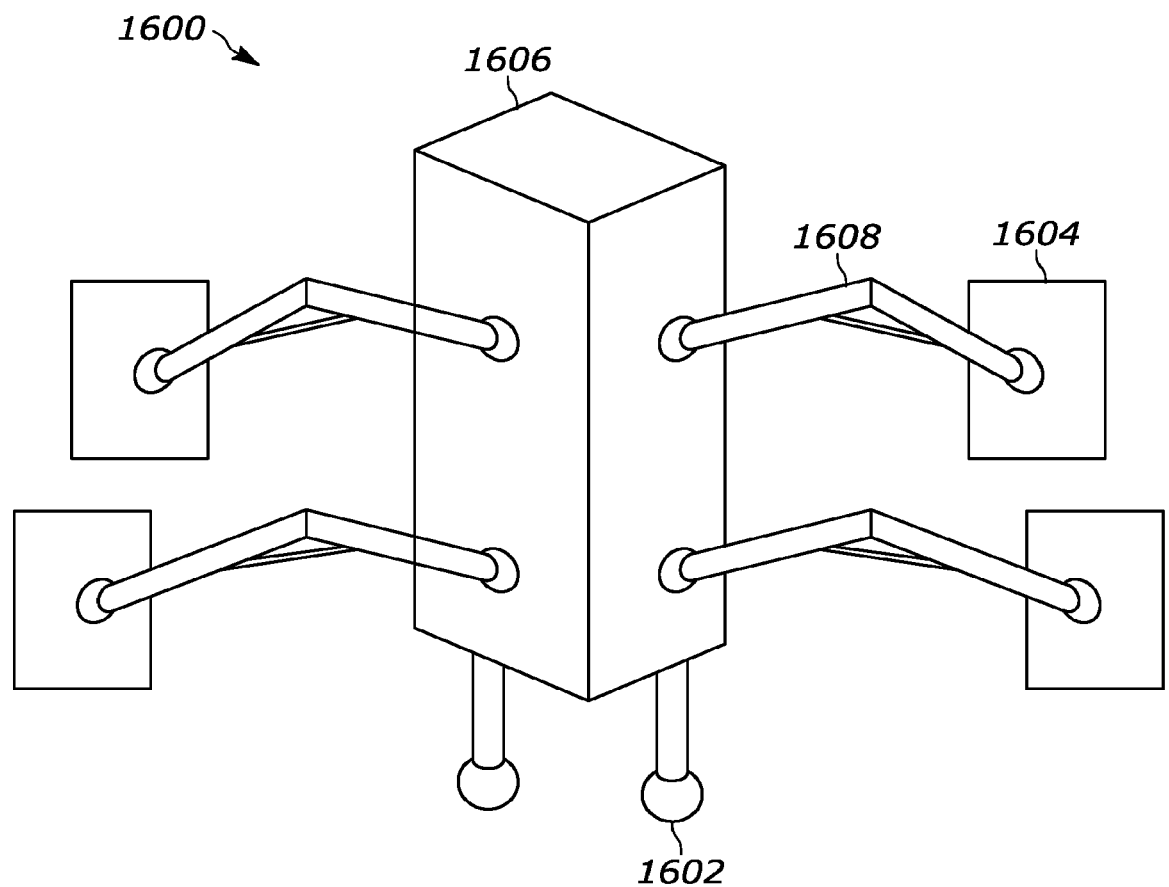
FIG. 16 is a schematic diagram related to physical space segments configured as a robot with movable panels.

FIG. 16 illustrates a barrier robot 1600 that may be motorized to move on wheels 1602 and that may include one or more flat panels 1604 connected to a robot body 1606 by motorized linkages 1608. The robot 1600 can be configured in accordance with simulation signals to simulate virtual world objects that can be felt in the real world by a user. Such robots can each have one or more movable items such as the panels 1604 that can be positioned relative to the user based on the relative position of the user to the in-game object being simulated by the robots. The upper panels 1064 shown in FIG. 16 can be useful for being felt by the user's hands, while the lower panels can be useful for being felt by the user's feet.

Each robot can follow the player as the player moves through a physical environment, corresponding to their movement through a virtual environment. For example, as the user approaches a wall in the game, a robot can position one or more panels 1604 so that as the user reaches out to touch the wall, the plates would be in the same physical location to the user in real life in which the wall is to the user in the virtual reality world. Cameras or other sensors can be used to determine where the user's hands are, so that only the portion of the wall that the user will come in contact with needs to be positioned by the robot.

As the user runs his hand along a wall, the robot can position another panel where the user's hand would reach the end of the plate that the user is touching, so that the user can continue to run his hand along the physical barrier. Multiple robots can be used to "leap frog" past each other to indefinitely position another plate at the end of the plate the user is currently touching. The robots do not need to position wall plates anywhere that the user would not come into contact with that portion of the wall.

A robot can have panels with different ex es and switch out which one it places within touch of the user based on the texture of the virtual world surface that the user would touch, as dictated by simulation play signals. A robot can also have different shaped panels, such as a curved panel to represent a pillar or other surface that is not flat. A robot can hold panels at different angles, to match the angle of surfaces in the game, including holding a panel horizontally to represent a horizontal surface, such as a tabletop.

In some implementations the robot can sense the amount of force that the user exerts on a barrier. The robot may move the barrier in reaction to the force exerted by the user. For example, if the user presses hard on a panel representing a wooden chest sitting on a pillar, the simulation can use that information to apply a force to the object in the game, which would cause the chest to be pushed back. The robot can then move the panel away from the user to match the movement of the object n the game, which would allow the user to feel his push move the chest.

In some implementations the robot can form a chair or other furniture. A user might even sit in a chair provided by a robot, which could then in turn move the user around the space to simulate a vehicle in the virtual world. Alternatively, the robot can move the user in a manner that does not correspond to movement in the simulation so that the user can be maintained within a physical area that is smaller than the game area. In such an implementation, the movement of the user might be made slowly and smoothly enough that it is not perceived by the user or perceived as matching a different in game movement.

Robots can have artificial hands, or other humanoid or monster features to simulate interaction between the user and creatures in the game, such as a character in the game reaching out and touching the user. A robot may be shaped as a manikin or android for highly interactive games. In some implementations a robot can perform tasks not related to a simulation when the user is not playing a simulation, such as holding its panels horizontally so that they act as a table or set of shelves. This is useful in a household setting where storage for a sizable robot could be hard to find unless the robot could be put to other uses when not being used for VR gaming.

When multiple players are playing computer simulations in the same physical location, the virtual worlds presented to both may be the same or different. When different virtual simulations are being played in the same physical space, for example, the same physical corridor in the physical world may represent a first type of tunnel or passageway in one simulation while the physical corridor can represent a different type of tunnel or passageway in a different simulation. The virtual image of a first player in the physical space playing a first simulation may be presented in the view of a second player playing a different simulation in the same physical space as an energy cloud, or a character that would naturally fit into the second simulation, etc.

Returning to the technique shown in FIG. 15 and discussed above and now referring to FIG. 17 for an example implementation, a cross section of a variable-axis motorized ball caster is shown. This ball caster is similar to ball casters used in factories to move palates but is motorized such that it can push the load resting on the ball along any axis. A grid of such ball casters can be used as a flooring surface in a virtual reality space to keep moving a person standing or walking on them so that he remains within the virtual reality space.

A large caster ball 1701, upon which the load (not shown) rests, is supported by a caster housing 1702 and is allowed to move freely by way of a series of ball bearings 1704. A retaining ring 1703 keeps the caster ball 1701 from being able to move up and out of the caster housing 1702. The caster ball 1701 is motorized by way of being driven by a drive wheel 1705 which is mounted on a shaft 1706. The shaft 1706 is mounted within an axis housing 1708, which determines which axis in which the caster ball 1701 is rotated by the drive wheel 1705 by rotating within the caster housing 1702.

The shaft 1706 is coupled to a main drive shaft 1710 by a set of beveled gears 1707. The beveled gears 1707 can have a gear ratio such that as the axis housing 1708 rotates within the caster housing 1702 the drive wheel 1705 is rotated as a rate that matches its travel along the surface of caster ball 1701 such that the ball is not moved by the turning of the axis housing 1708.

In some implementations the beveled gears 1707 can be implemented as a differential, such as the differential gears common in the axels of automobiles. In such a case another drive wheel can be mounted on the additional shaft from the differential such that it contacts the caster ball 1701 opposite of where the drive wheel 1706 contacts it. The differential gears in place of the beveled gears 1707 still allow the axis housing 1708 to turn within the caster housing 1702 without imparting movement to the caster ball 1701. By having two opposing drive wheels 1705 in contact with the caster ball 1701, the contact area is increased, which can increase the amount of force that can be applied to the caster ball 1701. Another advantage of having two opposing drive wheels 1705 is that it provides more even stresses on the caster ball 1701, which can help reduce friction and the wear on the mechanism along with increasing the precision in which the axis of rotation can be maintained.

Throughout the assembly, rings of ball bearings 1709a-1709j may be used to allow parts to rotate smoothly with reduced friction while being held firmly in place. In some light-duty implementations, some or all of the rings of ball bearings may be omitted in place of the parts being lubricated as they pass through a hole of an appropriate diameter to keep them from moving too far out of place. The ring of ball bearings 1709h can be omitted in implementations where the shaft it is on is not under much stress as that shaft is held on both ends by the rings of ball bearings 1709g and 1709i and the shaft can pass through a hole in the caster housing 1702 where 1709h is shown.

The axis housing 1708 is coupled to an axis motor 1712 through an intermediate set of gears 1711. This causes the axis housing 1708 to rotate as the axis motor 1712 spins, which is used to set the axis of rotation for the caster ball 1701 to align in any desired direction. The axis motor 1712 can be implemented as a stepper motor so that the number of rotations of the motor shaft, and thus the orientation of the axis housing 1708 can be known and controlled. In other implementations a sensor (not shown) can be used to determine the orientation of the axis housing 1708, which can be used to control the axis motor 1712 to rotate the axis housing 1708 to the desired orientation. A sensor (not shown) can also be used in conjunction with a stepper motor implementation to calibrate the system such that the orientation of the axis housing 1708 can be known after power loss when the system starts with an unknown orientation.

The main drive shaft 1710 can be coupled to a drive motor 1714 through a lower set of gears. In the implementation shown in FIG. 17 the lower set of gears is implemented as two pairs of gears, 1713a and 1713b, that have an intermediate shaft. The lower set of gears allows the gear ratio between the drive motor 1714 and the drive wheel 1705 to be controlled, as well as allowing control over the location of drive motor 1714 within the caster housing 1702.

The implementation of both the set of intermediate gears 1711 and the set of lower gears 1713a, 1713b can be devised of different numbers of gears and/or shafts with different gear sizes. This allows for greater control over the gear ratios and positioning of the axis motor 1712 and the drive motor 1714. The lower set of gears is shown as two pairs of gears with an intermediate shaft in FIG. 17. This has the advantage that the drive motor 1714 can be positioned in the center of caster housing 1702 below all other components of the apparatus, which allows for the size of the drive motor 1714 to be maximized for a given width or diameter of caster housing 1702, which is beneficial for high load implementations. This also has the advantage that a greater gear ratio can be obtained over a single pair of gears of similar size. Other configurations of gear sets 1711 and 1713 and the positioning and sizes of the motors 1712. and 1714 can be used to achieve different engineering goals. For example, the lower set of gears can be implemented as a single pair of gears, as is shown for the intermediate set of gears 1711. Such an implementation has the advantage that the drive motor 1714 can be positioned beside the axis motor 1712 reducing the height of the caster housing 1702. This configuration can have the disadvantage that a smaller sized drive motor 1714 must be used, which can limit the amount of load that the apparatus can be used for.

In some implementations the drive shaft 1710, or a shaft that is part of the lower set of gears, extends out of the caster housing 1702 and there is not a drive motor within caster housing 1702. In such an implementation the shaft extending out of multiple caster housings 1702 can be coupled to a single external shaft, which is then turned by a single larger chive motor. Such an implementation can be beneficial when implementing a grid of ball casters that all push with the same motion as a single drive motor can then be used for the whole grid of ball casters. Similarly, a shaft for controlling the rotation of the axis housing 1708 can extend outside of caster housing 1702 instead of having an axis motor 1712 for each caster housing. Such an implementation can allow a single external axis motor to control the orientation of the axis housing 1708 in multiple caster housings 1702. Such an implementation can be useful when the axis should be the same for all ball casters in a grid of ball casters.

In some implementations a number of ball casters can be implemented in a grid such that a load, such as a pallet being moved through a factory, upon the grid of ball casters can be rotated as well as moved across the grid. For example, such an implementation could be useful in a tee connector between conveyer belts in a factory where the item flowing along the conveyer belt might need to be rotated as it is directed to one of the other attached conveyer belts so that the same part of the item faces forward. Such an implementation can also be useful in a factory for a workstation where an item needs to stop at the workstation and be rotated to allow better access to different sides of the item before the item is passed along to the next station. In such an implementation the grid of ball casters can rotate the item around an axis of rotation that is directly under the item and within the grid of ball casters. This is opposed to the first example where the axis of rotation of the item being rotated was outside of the item and the d of casters. When configured to rotate items, each ball caster in the grid may be controlled individually and will have its axis housing 1708 aligned perpendicular to the axis in which the item on the grid is being rotated around. The ball casters farther away from the axis of rotation of the item being rotated will need to spin faster to drive the outer portion of the item at a higher speed than the inner portion of the item that is closer to the axis of rotation. The action of the grid of ball casters can be controlled so that the grid of ball casters aligns and drives each ball caster depending on the work to be done by the grid of ball casters at that point in time.

In most implementations, the caster housing 1702 can be implemented as separate parts that are fastened together to allow for easier manufacture and maintenance, such as a left and right halves, front and back halves, or a series of stacked rings.

In some implementations, the drive wheel 1705 can be pulled away from the caster ball 1701 to allow the caster ball 1701 to freely rotate in all directions. Such an implementation can be accomplished by having the axis housing and related gears and/or motors mounted inside of an engagement housing (not shown) within the caster housing 1702 such that the engagement housing can move towards and away from the ball caster 1701. When the engagement housing presses the drive wheel 1705 against the caster ball 1701 when the drive wheel 1705 is not spinning it acts as a break, which keeps the caster ball 1701 from rotating.

In some implementations, the drive wheel 1705 can be disengaged from the drive motor 1714. Such an implementation allows the caster ball 1701 to spin freely along the axis corresponding to the orientation of the axis housing, while resisting rotation along other axis. By engaging and disengaging the connection between the drive wheel 1705 and the drive motor 1714, the caster ball 1701 can be switched between free spinning along one axis and driven along one axis. The axis in which the caster ball is allowed to spin freely can be controlled by rotating axis housing 1708. In some implementations, the drive wheels are never connected to a drive motor and the ball caster 1701 is always in a free spinning configuration. Such an implementation can be accomplished by having a solenoid that can move drive shaft 1710 so that in one position it causes the set of gears 1707 to be engaged and in another position, it causes the set of gears 1707 to be disengaged. Other implementations are possible, and the linkage between the drive wheel 1705 and the drive motor 1714 can be disconnected at any point in the linkage between the two.

Implementations can combine aspects of all of the mentioned implementations. For example, a ball caster assembly may have an engagement housing to allow the caster ball 1701 to be toggled between free flowing and driven, a solenoid to disengage the connection between the drive when 1705 and the drive motor 1714 to allow the caster ball 1701 to be toggled between free flowing only along a single axel and being driven, and a differential in place of the set of gears 1707 to have two opposing drive wheels 1705 in contact with the caster ball 1701.

While the above techniques apply to a variety of computer simulations, as alluded to above they may be applied in particular to eSport applications.

Competition can take place between players using different equipment. For example, a player using a recirculating pillar pod, such as is shown in FIG. 11, may compete against a player using a pillar pod using ball casters, as shown in FIG. 15, and both players would have a similar experience. Similarly, players using pods made by different manufacturers, where things such as dimensions vary between the implementations, can play against each other and have a very similar experience.

If a player using a ball caster pod that does not have pillars to change elevation plays against a player that uses a pod that has pillars or other means to change elevation then both players can still play in the same virtual environment, but the player that has the pod that has elevation changes will have a more immersive experience. If a level playing field is desired, then the pod that supports elevation changes can be set to always simulate flat level ground so that both players have a similar playing experience. If a player using a pod plays against a player in an arena the dimensions of the virtual world in which the two will play can be limited to an area that will fit within the dimensions of the arena so that the player using the pod will not have an advantage when the player in the arena reaches the edge of her physical environment.

Players using significantly different equipment can still play in the same virtual game environment with each other, even though the players will have different levels of immersion in their game play. For example, a first player may play using VR in a pod while a second player may be playing using VR while moving around in an arena while a third player may by wearing a VR headset sitting on their living room couch while a fourth player may be playing by watching a traditional two-dimensional TV screen. All four players may be playing in the same game match in the same virtual environment.

Casual groups of players or leagues of people playing for fun may be quite lenient in the variety of equipment that players in the same game match are allowed to use. This can allow for great inclusivity in allowing people to join as people who would like to play would not be required to use expensive equipment to be able to play. For more serious players or leagues, such as professional eSports leagues or official intercollegiate leagues, there would usually be more rigid specifications for what equipment players use when competing against each other educe the advantage that certain players have from the equipment that they are using.

In some leagues, all players in a match must be playing in the same physical location. This can be implemented in a variety of ways, such as all players playing in one common arena area, one arena area per team, or one pod per player. Such a league can ensure that all players in a match are using comparable equipment in a comparable environment. In some cases, one or more teams and/or players will travel to a venue for the competition. A match played in a common location can be competition between one or more teams or can be competition between individual players.

In some leagues, the members of each team may play together in the same physical location, but opposing teams are located in separate physical locations. In other leagues each player in a match plays in their own pod, where the physical location of each pod is not important. In some cases, there can be multiple players in pods all located at a first physical location while some of the players in the match are in pods not located at the first physical location.

Some venues may be set up to provide areas for presenting eSports gaming for spectators to view. The presented gaming may take place fully or partially at the same physical location as the viewing venue or may take place completely in one or more other physical locations. The presented gaming may be watched live or may be recorded game play. Such spectating may include seeing players directly and/or seeing video of players in the physical environment and/or seeing renderings of the virtual environment in which the players are playing and/or seeing other generated content, such as a score board or map of the virtual game area. The renderings of the virtual game world may include renderings from a fixed camera position, renderings from the point of view of a player, or renderings from a point of view that follows a player, team, or the action of the game. In some instances, a human may control the point of view for one or more renderings. In some instances, the views shown may be changed throughout the game play to better focus viewers on the action of the game. In some instances, there can be game commentary presented to viewers.

In some implementations, a venue includes one or more main screens viewable by multiple spectators as well as provide one or more screens specific to one or more viewers. The viewer specific screens may be screens that are part of the venue and/or may be video, apps, or other media provided to devices owned by the viewer. Such viewer specific screens may be interactive. Such viewer specific screens may be used to provide game coverage specific to a particular player or team.

Some venues may be set up with 3D display screens such that spectators wearing 3D glasses can watch game play action in 3D and experience the game closer to how the players experience it than they would watching the game play on a 2D screen.

In some implementations, a venue may provide spectators with VR headsets to watch game play immersed in the virtual world in which the game play is taking place. Such VR headsets can display the game from one or more common viewpoints or can allow the spectator to control the location of the viewpoint. A spectator may be allowed to have his or her viewpoint automatically follow a particular player or team.

In some implementations, a video game may be broadcast to allow viewing by spectators that are not at the location where the game is played, such as a game that is part of an eSports league. Such a broadcast may include multiple video feeds and/or renderings. For example, a sports bar may use multiple TVs to show a live eSports event. In such an implementation, different TVs may show the virtual game world from different points of view. Available video feeds may follow different players in the game or show a rendering of a player's point of view or show video footage of the player in the physical world. A user interface can be provided to allow the selection of which video and/or audio feeds to display from the available choices. In some implementations, the user interface may allow an output to be created based on multiple available choices, such as to tile multiple video feeds into a single video output to be displayed. For example, an output may tile the physical world video feed of eight players around a leaderboard video feed to create the output that is shown on one TV screen. In another example an output my show the in-game point of view of the player that is at the top of the leaderboard, and automatically switches to another player if that player gets positioned at the top of the leaderboard. One or more of the available video feeds may be curated, such that they are switched around to follow the action in the game, similar to how traditional sports broadcasts switch cameras and camera angles to follow the action of the game. Such curation may be done automatically or may be fully or partially human guided. There may be one or more audio commentary feeds available, which may also have video feeds of the commentators. This can be useful for providing commentary in different languages, and for providing commentary from the prospective of different teams or players.

In some implementations, models from a game along with the positioning of objects during game play can be saved in a game-agnostic file format so that the game play can be played back by software not related to the game software. Such a game playback can render the game play from an adjustable location with an adjustable field of view and can support rendering in 3D and the generation of multiple simultaneous renderings of the playback.

In some implementations of a pod there are one or more cameras mounted in relation to the pod. This allows the generation of video coverage of the player in action, which may be desired by spectators, in sonic implementations, the cameras are mounted so that they can be smoothly rotated around the pod, which can be used to keep the camera facing the player from the same angle as the player turns in the pod.

In some implementations an automated arena can adjust to be laid out the same as a non-automated arena, which will allow comparable game play between the two venues as long as the automated arena stays in the same configuration during game play, or only adjusts to mimic changes that happen in the non-automated arena.

A league can be based on a standard set of set pieces that can be used to transform an empty space into an arena for VR play. Some set pieces can be adjustable in size and/or other aspects. For example, a ramp can have both its length and ending height adjusted, which allows for the ramp to have a wide range of angles. In some implementations, an arena can use static set pieces to achieve a set up comparable to how an automated arena is set up. This can be done by having humans manually move static set pieces to the desired positions and set any adjustments on the set piece based on the layout being set up.

In some implementations, a physical location may have multiple areas that are each set up as an arena. In such an implementation, players may move from an arena set up in a first physical area which is set up in a first layout to a second physical area which is set up in a second layout. This allows players in that physical location to quickly change between the first layout to the second layout. This can be useful when players in that physical location are playing against players in an automated arena that can quickly change its layout from the first physical layout to the second physical layout.

In some implementations, set pieces may be lowered from above to be positioned correctly. Such a system can provide a means to quickly add and remove walls from an arena. The lowering of set pieces into position from above can be automated to improve the speed and accuracy in which the set pieces can be positioned.

In some implementations the floor of an arena can have markings such as grid lines and/or numbers to aid in the layout of the set pieces. In some implementations, projectors can display guide markings on the floor for use in positioning set pieces.

In some implementations, a human that is physically positioning a set piece can wear a VR headset to guide placement of the set piece. Such a headset can display an augmented reality view that combines a view of the physical environment with computer generated content, such as a glowing outline of where the set piece being positioned should be positioned. Similarly, the headset can show computer generated guide lines for use in positioning set pieces. The headset can give feedback for when the set piece is in the correct position, such as by tuning the outline or guide lines that is shows green when the set piece is correctly positioned. The headset can be switched between the set piece to be positioned. The headset can show both where a set piece should be positioned along with where that set piece is now. The arena can detect the position of set pieces using the sensors that are used for game play. The arena can detect things that are specific to a set piece, such as an RFID tag embedded in the set piece, to determine the location of a particular set piece.

In some implementations, a virtual game environment might consist of multiple levels. An arena may have set pieces that can be used to create a multi-level layout, such as platforms, ramps, and stairs. If there is a standard set of set pieces for this, then game levels can be based on the available set pieces so that the virtual game environment can be recreated in an arena using the standard set pieces. In some implementations, platforms can be lowered from the ceiling, which has the advantage that the area under the platform is clear and game play in that area is not obstructed with things such as support pillars. For safety, platforms may have railings across edges that are open in the virtual game world.

In some implementations, a set piece can be designed so that it positions itself in the desired location. Such a set piece can alter other aspects of itself to conform to the desired configuration of the arena, such as altering its height or width, or altering the angle in which it is oriented. An arena can have a standard set of automated set pieces to allow it to be automatically configured for any game match that is based off of the standard set of set pieces. Automated set pieces can coordinate with each other by communicating with the other automated set pieces and/or through communication with a centralized server so that they do not collide with each other or with any of the players.

In some implementations, an automated arena may also have set pieces in addition to the generic automation it can do with things like pillars from above and/or below and/or ball casters. Such set pieces can be useful for physical environments that cannot easily be created by the general automation of the arena, such as a crawl space that a player has to crawl through, an odd shaped object in the space that needs to be interacted with, or an object that the player must physically move. Such set pieces may be automated or may be manually positioned. A general-purpose robot may be used to position a non-automated set piece, such as an object that needs to be physically moved by a player.

In some cases, a game may be able to use the sensors or other information from a venue, such as communication with robotic set pieces, to determine the physical layout of the venue. That physical layout can then be used by the game to create a virtual world that conforms to the physical layout of the real-world venue. In some implementations, sensors can be used to determine the layout of an existing real-world venue, such as a park or interior of an office, which will allow that physical space to be used to play a VR game. In some implementations, drones are used to provide sensors to use an existing physical space as a VR gaming space.

In some implementations, video from cameras used to provide views of the physical world playing environment for spectators can be analyzed and used to improve the accuracy of the determination of players within the physical environment. By having cameras pointed at areas where there is a lot of in-game action, in addition to providing a good view fur spectators, it can provide another view for analyzing the position of players. This can be especially useful when players may be close together and may obstruct how much of each player a particular camera can see.

In some implementations, an eSports game, or levels within a game to be used for eSports are designed based on the capabilities of the gaming venues in which the game will be played. This design can be based on standard specifications for the venues in which the game will be played in an eSports league. An eSports game can be designed so that it can adjust based. on the physical qualities of the arenas and/or pods in which each match will be played. For example, the required vertical range can be limited based on the minimum range of pillar motion among all of the players in a particular match. Similarly, if players in arenas of different sizes are playing, the dimensions of the game areas can be adjusted to fit within all of the arenas being used by players.

For safety, the VR system can detect when there is a malfunction or other situation that can be a danger to the player. For example, if there is an object in the playing area that is not supposed to be there, such that the user would not see it in the virtual world and would not expect an object to be in that position, then the player may run into the object and injure himself if he is not alerted to its presence. Similarly, if there is something that is not in place, such as a platform for the user to step on, or a safety railing, that should be there, it can potentially cause injury to the player if the player is not alerted to the problem. As the player realizes that she is playing a video game where any injury to her character in the game environment is just part of the game, which may create a false sense of safety in the player and lead to the player focus less on personal safety in the physical environment. In some implementations, the headset can switch from showing the virtual world to showing a view of the physical world, which can alert the user to potential danger in the physical world and let her see the danger. This can be accomplished by having cameras on the headset to capture the view of the physical world. Sounds and visual indicators can also be used to alert a player to danger, such as flashing the display red or playing a particular sound. In the case of an object, such as an out of place set piece, item dropped by a player, or person walking through the arena, that exists in the physical world that does not exist in the virtual world, the headset can display the physical world view of that object immersed in the rendering of the virtual world so that the player can see that the object is there. This can further be highlighted visually, such as to draw a glowing halo around the object.

Figure 18:
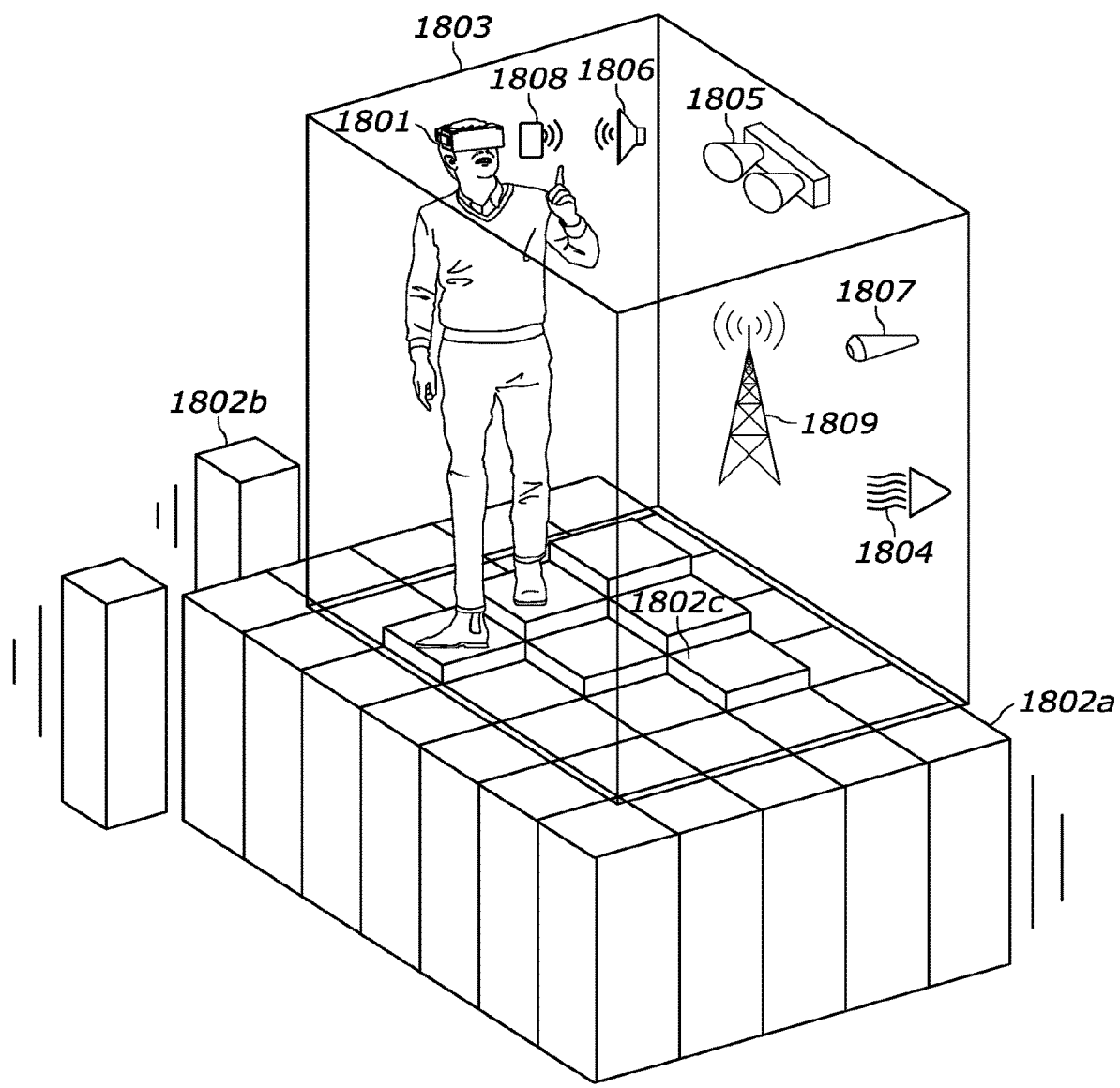
FIGS. 18 and 19 are a schematic diagrams of example details of a pod implementation.

FIG. 18 shows an exemplary implementation of a pod used for VR, which is implemented using a recirculating grid of variable height pillars 1802. Such an implementation can provide a more immersive virtual reality experience to the player 1801 that uses the pod as it allows the player to travel indefinitely in any direction. The variable height floor that can be achieved by the variable height pillars 1802 also adds to the level of immersion. As can be seen in FIG. 18, some of the variable height pillars 1802c may be raised to provide the player 1801 the experience of walking uphill. A variable height pillar 1802a is part of the grid of pillars that form a solid grid for the player 1801 to walk on, and which is moving under the pod to keep the player from moving too close to the edge of the pod. As the edge of the grid moves out of the playing area, pillars 1802b are removed from the grid and recirculated around to the edge of the grid that is moving into the playing area to provide a continuous flow of pillars under the player 1801. Within a geographic location, pods can be stacked and/or combined to form a larger multi-player physical VR world. Such multi-player features can be achieved through mechanisms such as new levels, keys, trophies, or in-game purchases.

The pod is shown surrounded by walls 1803, which provide a barrier prevent player 1801 from reaching the edge of the grid of pillars and can prevent the player 1801 from falling off should the player fall or the mechanism malfunctions. While the pod shown is a square shape, there is no limit to what shape the pod can be, including a rectangle, hexagon, circle, or irregular shape. The pod can be open on top, have a roof, or may have another grid of variable length pillars 1802 above the player, which may or may not be recirculating. The walls 1803 can provide a sound barrier between the player 1801 and things outside of the pod. This can be useful in a location where there are multiple pods in close proximity. This may also be useful to prevent sound outside of the pod from disturbing the player 1801, such as if there are spectators in close proximity to the pod, or if the environment outside of the pod is noisy. Walls may also keep sound inside the pod, such as sounds made by the player 1801 or speakers in the pod 1806 from disturbing people outside of the pod. In some implementations, all or part of the walls of the pod 1803 may be made out of glass or other transparent materials to allow easier viewing of the player in the pod.

In some implementations the pod includes one or more air jets 1804, which can blow air into the pod. The air can be directed so that the player 1801 feels the air movement in relation to something in the virtual environment. Such air movement can be localized, such as to mimic the feeling of brushing against weeds as a player is walking through a virtual field, or can be broader, such as to mimic a gentle spring breeze, or a storm blowing in. The air can also be of a different temperature to correspond to the virtual environment, which may be effective in a pod surrounded by walls.

In some implementations the pod includes one or more cameras 1805. The camera depicted is a 3D camera, but other types of cameras may be used. The camera 1805 can be in a fixed position or can be movable. The video captured by the camera can be used in determining the player's 1801 positioning within the pod. The video captured by the camera can be provided for viewing by spectators. The video captured by the camera can be recorded for later playback.

In some implementations the pod includes one or more speakers 1806. The pod may surround the player with multiple speakers 1806 to allow the player to perceive directional sound without the player needing to wear headphones. In some implementations, the user can be presented the game sound through headphones, but one or more subwoofers 1806 in the pod will provide low frequency sounds, which can allow the low frequency sounds to be felt by the player 1801 where the player would not be able to feel those sounds if the sounds were presented through the headphones. Such low frequency sounds can be used to provide a realistic feel for saturations such as when a large object falls on the ground near the player. Low frequency sounds can be combined with floor movements to increase the intensity in which the player 1801 feels them.

In some implementations the pod includes one or more microphones 1807 which can be used to allow the player 1801 to give voice or other audio input to the game without the need to have a microphone in the headset worn by the player 1801. This can make conversing with in-game characters much more natural and immersive.

In some implementations the pod includes one or more sensors 1808 which can be used to detect the player's position and movements within the pod. Such sensors 1808 can include a variety of sensor technologies, such as radar, lidar, infrared cameras, or ultraviolet cameras.

In some implementations the pod includes one or more antennas 1809 to communicate with equipment worn or held by the player 1801. This can provide all of the communication needed to the player 1801, including to their headset, so that no wires need to be attached to the player, which could get twisted and get in the player's 1801 way during game play.

Figure 19:
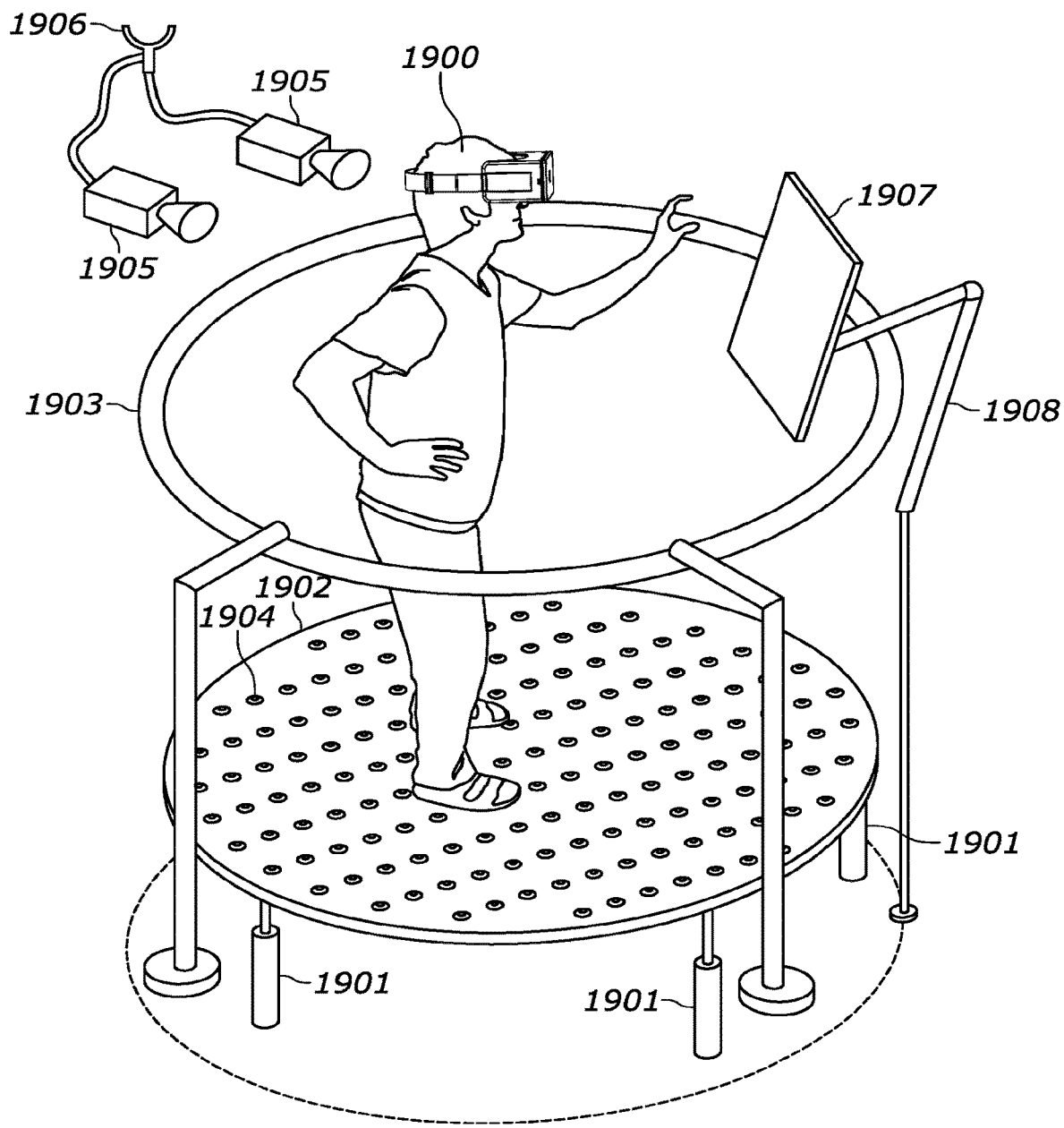

FIG. 19 shows another exemplary implementation of a VR pod, which is implemented by having a grid of motorized ball casters 1904 on a movable platform 1902. The pod is surrounded by a railing 1903, which prevents the user from leaving the area above the movable platform. The movable platform may be moved up and down and is tilted by extendable supports 1901. As is depicted, the movable platform 1902 is tilted with respect to the horizontal to provide the user 1900 with the experience of walking uphill. The motorized ball casters 2004 spin to keep the player 1900 positioned within the playing area and keep the player from getting too close to the edges of the pod. The feet of the player 1900 each are positioned over multiple motorized ball casters 1904 such that as the balls rotate the player 1900 is moved.

In some implementations, the pod has one or more cameras 1905 which can be rotated around the player 1900. This can be used to provide a view of the player 1900 from a consistent angle as the player rotates within the pod. This may be accomplished by mounting the camera 1905 on an arm mechanism 1906 that rotates around a point in the center of the pod. The mechanism shown has two arms to rotate two cameras 1905 around the player. In some implementations, the camera 1905 can move up and down the arm to provide points of views from different heights. In some implementations, the arm mechanism 1906 that the camera 1905 is mounted on can be telescoping to move the camera up and down. A telescoping implementation has the advantage that there is not a section of the arm mechanism 1906 extending below the camera 1905 which could obstruct the view of another camera 1905 mounted on another arm of the arm mechanism 1906. In some implementations, the camera 1905 can be rotated around the player by following tracks or guides, not shown, around the perimeter of the pod.

In some implementations, one or more objects 1907 may be extended into the pod for the player 1900 to interact with. FIG. 19 depicts a flat panel object 1907 being extended into the playing area. A flat panel can be interacted with by the user to represent the user touching a wall or interacting with a touch screen display. A flat panel can also be rotated horizontally to represent a table top. Many other shapes and sizes of objects can be extended into the playing area for the user to interact with. In some implementations, the objects extended into the pod for the user to interact with can be used as controls for a game, such as buttons, levers, dials, knobs, or wheels. In some implementations, an object can be extended into the playing area for the user to pick up and physically move. Another object can be extended into the playing area to provide the user a place to put down the object. In some implementations, a robotic arm can be used to grab an object being held by a player and take it from the player. Multiple objects can be extended into the playing area at the same time. FIG. 19 shows an armature mechanism 1908 being used to extend objects into the playing area, which can rotate around the playing area to be able to extend the objects from the angle that is most appropriate for the virtual environment. While FIG. 20 shows the armature mechanism 1908 supported from the floor, it can just as easily be supported by the walls, ceiling, or be mounted to the structure that supports the railing 1903.

An implementation of a pod may contain any combination of implementations discussed. For example, a pod that uses a railing 1903 to keep the player 1900 within the playing area can also be surrounded by walls 1803 for sound insulation.

It will be appreciated that whilst present principals have been described with reference to some example embodiments, these are not intended to be limiting, and that various alternative arrangements may be used to implement the subject matter claimed herein.

What is claimed:

1. An assembly comprising:
   at least a first headset wearable by a first user in a first physical space containing at least a first object, the first headset configured for presenting on a display of the first headset a first virtual image of the first physical space from a perspective of the first headset relative to the first physical space, the first virtual image including an image of a second user at a location and pose derived from a real world location and pose of the second user;
   at least a second headset not in the first physical space and wearable by the second user, the second headset being configured for presenting on a display of the second headset a second virtual image of the first physical space from a virtual perspective of the second headset relative to the first physical space, the second virtual image including an image of the first user at a location and pose derived from a real world location and pose of the first user; and
   plural motorized balls in the first physical space and movable according to a computer simulation presented on the first headset.

2. The assembly of claim 1, wherein the first headset is configured to alter a texture of the virtual image of the first physical space according to a computer simulation presented on the first headset.

3. The assembly of claim 1, wherein the first headset is configured to alter a transparency of the virtual image of the first physical space according to a computer simulation presented on the first headset.

4. The assembly of claim 1, wherein the second headset is disposed at a spectator location in the real world.

5. The assembly of claim 1, comprising plural movable segments in the first physical space and movable according to a computer simulation presented on the first headset.

6. The assembly of claim 5, wherein the segments comprise at least a portion of a floor and define top surfaces movable up and down in the first physical space.

7. The assembly of claim 5, wherein the segments comprise a rotatable floor portion in the first physical space.

8. The assembly of claim 6, wherein the segments circulate in the first physical space in the horizontal dimension of the first physical space.

9. The assembly of claim 6, wherein the segments circulate in the first physical space in the vertical dimension of the first physical space.

10. An assembly comprising:
    at least a first headset in a first physical space, the first headset configured for presenting on a display of the first headset a virtual image of the first physical space from a perspective of the first headset relative to the first physical space; and
    plural movable segments in the first physical space, the plural movable segments being implemented in a pod and being moved according to signals from a computer simulation, wherein the pod comprises a recirculating grid of variable height pillars.

11. The assembly of claim 10, wherein the pod comprises walls to prevent a player from reaching an edge.

12. An assembly comprising:
    at least a first headset in a first physical space, the first headset configured for presenting on a display of the first headset a virtual image of the first physical space from a perspective of the first headset relative to the first physical space; and
    plural movable segments in the first physical space, the plural movable segments being implemented in a pod and being moved according to signals from a computer simulation, wherein the pod includes one or more air jets, one or more cameras, and one or more speakers.

13. The assembly of claim 10, wherein the pod comprises one or more antennas to communicate with equipment worn or held by a player.

14. An assembly comprising:
at least a first headset in a first physical space, the first headset configured for presenting on a display of the first headset a virtual image of the first physical space from a perspective of the first headset relative to the first physical space; and
plural movable segments in the first physical space, the plural movable segments being implemented in a pod and being moved according to signals from a computer simulation, wherein the pod comprises a grid of motorized ball casters on a movable platform.

15. The assembly of claim 14, wherein the movable platform is movable up and down and is tiltable.

16. The assembly of claim 15, wherein the pod comprises one or more movable cameras.

* * * * *